United States Patent [19]

Galer

[11] 4,210,179
[45] Jul. 1, 1980

[54] PIPE-THREAD PROTECTOR

[75] Inventor: Herbert W. Galer, Newnan, Ga.

[73] Assignee: United States Steel Corporation, Pittsburgh, Pa.

[21] Appl. No.: 971,978

[22] Filed: Dec. 21, 1978

[51] Int. Cl.² .............................................. B65D 59/00
[52] U.S. Cl. ................................................... 138/96 T
[58] Field of Search .................... 138/96 T, 96 R, 89, 138/109; 16/2, 108

[56] References Cited

U.S. PATENT DOCUMENTS

| 2,204,130 | 6/1940 | Engstrom | 138/96 T |
| 2,893,438 | 7/1959 | Rickard | 138/96 R |
| 2,989,087 | 6/1961 | Higgins | 138/96 T |
| 4,046,168 | 9/1977 | Milne | 138/89 |
| 4,079,756 | 3/1978 | Smiley | 138/96 T |

Primary Examiner—Lenard A. Footland
Attorney, Agent, or Firm—Walter P. Wood

[57] ABSTRACT

A pipe-thread protector which includes a molded plastic drum-shaped body and a solid metal band encircling the body. The body has a corrugated outer circumferential wall, a concentric inner wall spaced from the outer wall, and a corrugated web joining the two walls at one end. An end wall is joined to the inner wall. The other end of the outer wall carries an integral ring. The inside of the outer wall has lengthwise ribs which have internal screw threads. The space between the walls forms an annular pocket for receiving the end portion of a pipe, while the internal threads engage the pipe threads and the ring snugly receives the pipe beyond the threads.

11 Claims, 4 Drawing Figures

PIPE-THREAD PROTECTOR

This invention relates to an improved molded plastic protector for pipe threads.

Conventional practice is to cover the threaded end portions of metal pipes with protectors which prevent damage to threads during handling and shipment. Some protectors also close the ends of the pipe to exclude water and other foreign material. Protectors used heretofore have been formed of metal, fiber material or plastic. They have been held in place either by threaded engagement with the pipe threads or by metal straps. For showings of typical thread protectors used heretofore reference can be made to Schirra U.S. Pat. Nos. 600,892 and 1,349,789, Lytle U.S. Pat. No. 2,121,436, Higgens U.S. Pat. No. 2,989,087, or Smiley U.S. Pat. No. 4,079,756, as well as others in U.S. Class 138/96.

An object of my invention is to provide an improved molded plastic thread protector which is easy to manufacture and to install on a pipe, yet affords full protection to threads even though the pipe may be exposed to severe conditions of heat or cold.

A further object is to provide a thread protector which offers the foregoing advantage and the walls of which yield as they expand or contract at rates different from the metal of the pipe through large temperature changes.

A further object is to provide an improved thread protector of molded plastic which carries a solid circumferential metal band, the plastic walls being yieldable to enable the band to be placed on the body beforehand and the protector to be driven onto the end portion of a pipe.

A further object is to provide an improved thread protector which has sets of internal threads of at least two different forms (for example "V" and buttress), whereby one set of internal threads engages matching external threads on a pipe, and the wall of the protector yields to enable the other set of threads to overlie the pipe threads without interfering.

Figure 1:
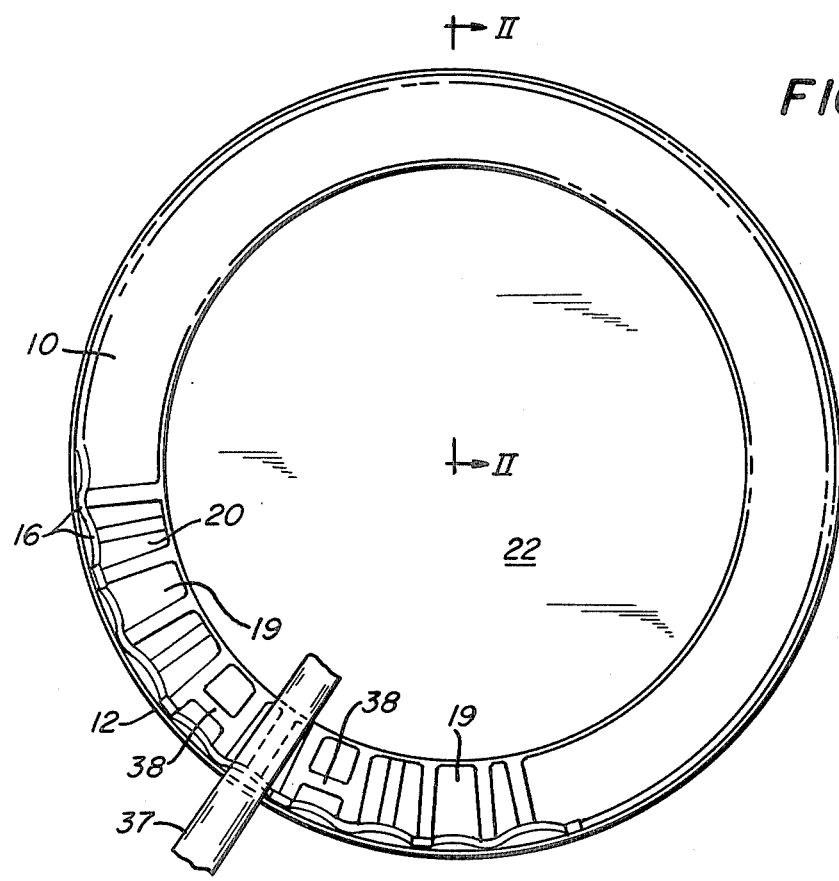
FIG. 1 is an end elevational view of my thread protector from the closed end.
Figure 3:
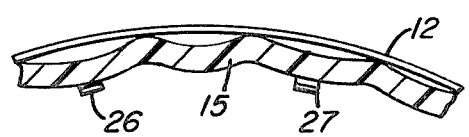
FIG. 3 is a fragmentary cross section on line III—III of FIG. 2.
Figure 4:
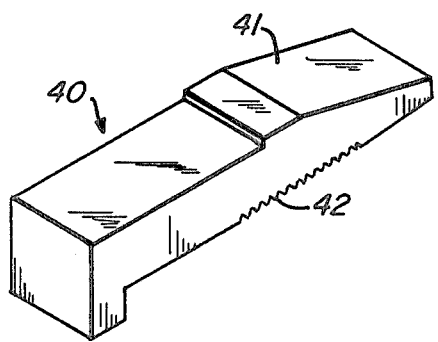
FIG. 4 is a perspective view of a wedge which may be used in conjunction with the thread protector.
Figure 2:
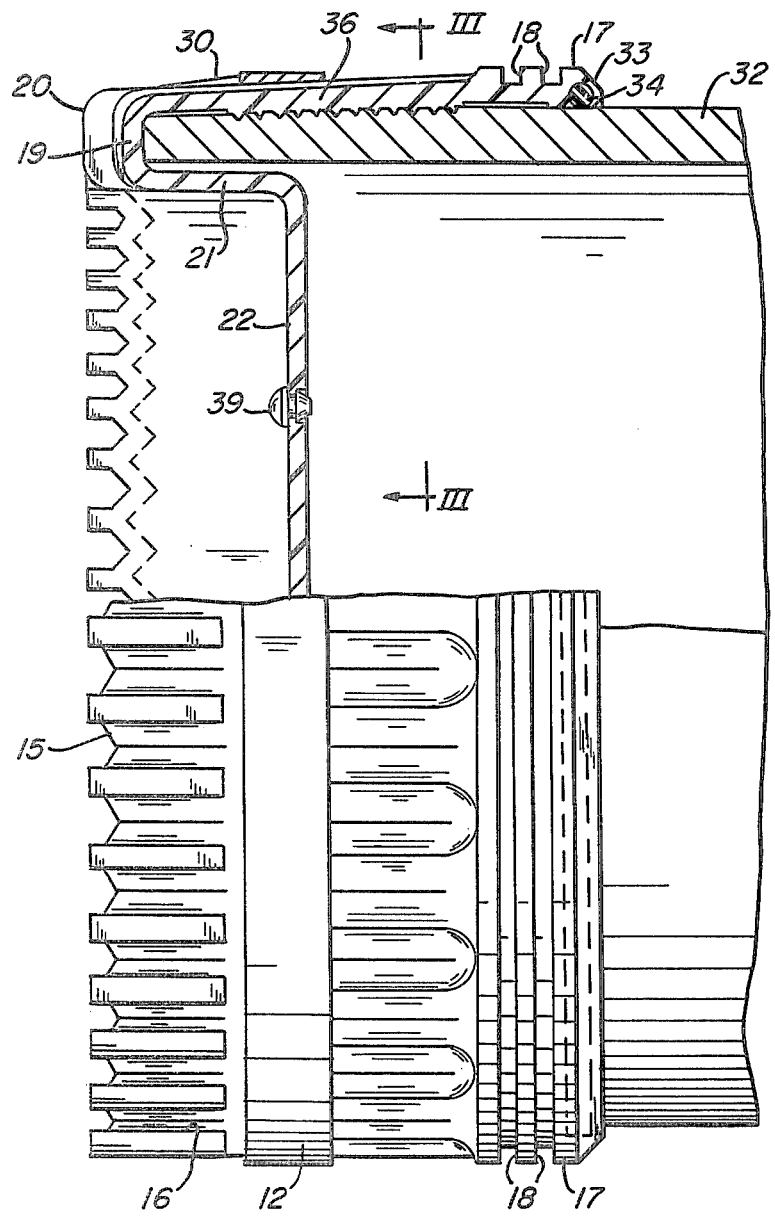
FIG. 2 is a side elevational view of the protector installed on a pipe, partly in section on line II—II of FIG. 1.

The thread protector of my invention includes essentially a one-piece drum-shaped molded plastic body 10 and a solid unbroken metal band 12 encircling the plastic body. The preferred plastic is high-density, high-molecular weight polyethylene, but other materials may be used, for example, natural rubber, buta N rubber, rubber-modified high-impact polystyrene, or polypropylene if the protector is not exposed to high temperature. The band 12 preferably is steel. The left and right ends of the body, as viewed in FIG. 2, are referred to as the "closed end" and the "open end" respectively.

The plastic body 10 has an outer circumferential wall 15 which tapers toward the closed end and has lengthwise corrugations 16. An enlarged integral ring 17 is joined to the outer wall 15 at the open end. Preferably the ring has grooves 18 which extend around its circumference. The grooves descrease the thickness of plastic and thus facilitate curing in the mold and also afford shock resistance when the protector is dropped. A relatively narrow integral annular web 19 is joined to the outer wall 15 at the closed end and extends inwardly toward the central axis. The web has corrugations 20 which are continuations of corrugations 16. An integral cylindrical inner wall 21 is joined to the web 19 at its inner circumference and extends back toward the open end of the protector. The inner wall 21 is concentric with the outer wall 15 and spaced therefrom and preferably is of somewhat shorter axial length. An integral end wall 22 is joined to the inner wall 21 at the end opposite the web 19.

The inside face of the outer wall 15 carries a series of integral lengthwise ribs 26 and 27 spaced uniformly around its circumference. Alternate ribs 26 carry internal threads of one form, for example V-threads. The other alternate ribs 27 preferably carry internal threads of a different form, for example buttress threads. In each instance the threads preferably extend straight across the ribs (not helical)

The band 12 is forced over the outer wall 15 from the closed end of the thread protector and fits tightly around the wall. One or more ridges of the corrugations 16 carry ramps 30 which serve as stops to retain the band on the plastic body. The corrugations 16 permit the body to yield sufficiently for the band to pass over the ramps as the band is placed on the body.

With the band already in place, the protector is forced over the threaded end portion of a pipe 32, as shown in FIG. 2. The space between the outer and inner walls 15 and 21 forms an annular pocket which receives approximately the last inch or more of the pipe, depending on the size of pipe. The width of the pocket is sufficient to receive pipe of maximum wall thickness with which the protector is used. If the thickness of the pipe wall is less than the maximum, there is a space between the pipe wall and the inner wall 21. The internal threads on either ribs 26 or 27 engage the external pipe threads, depending on whether the pipe has V-threads or buttress threads. The corrugated outer wall 15 yields sufficiently that the other set of threads overlies the pipe threads without interfering.

The taper in the outer wall 15 is approximately the same as the taper in the threaded portion of the pipe. The taper provides means for further tightening the wall of the thread protector on the pipe. The band 12 can be driven axially from its original position along the tapered wall. As the band is driven, it encounters an ever-increasing diameter of the protector wall, whereby the wall engages the pipe more and more tightly. The axial length of the thread protector body is such that the ring 17 engages the pipe wall inwardly of the threaded portion where the pipe wall is cylindrical. The inside diameter of the ring is such as to engage the pipe wall snugly. As an optional feature, ring 17 may have a groove 33 around its inner circumference and a resilient O-ring 34 fitted into the groove. The O-ring effectively prevents any water or other liquid from leaking around the thread protector.

The thread protector can be unscrewed from the pipe to remove it when the pipe is placed in service. Conveniently a tool 37 can be placed across a diameter of the protector between corrugations 20 of web 19 to enable the necessary force to be applied. Preferably integral reinforcing ribs 38 are molded between certain of the corrugations 20 to strengthen them and enable them to withstand the force applied through the tool.

The end wall 22 completely closes the end of the pipe and prevents water or other foreign material from entering the pipe. As an optional feature, the wall may contain a small relief valve 39. If the pipe is exposed at high ambient temperature, internal pressure of air in the pipe increases. The valve can open to relieve the pressure, but otherwise is closed to prevent leakage into the pipe.

As a further optional feature, a wedge 40 may be driven between the metal band 12 and the plastic outer wall 15. One face of the wedge is flat except for a ramp 41. The edge of ramp 41 abuts the edge of the band 12 to lock the wedge in place. The outer wall may have a narrow flat area which the wedge abuts. The other face of the wedge has serrations 42 to engage the outer wall.

The corrugations 16 and 20 in the outer wall 15 and web 19 enable the wall and web to yield when the band 12 is placed over the plastic body 10, and again when the thread protector is placed on a pipe 32, as already explained. When the pipe is subjected to extreme ambient temperatures, either high or low, the plastic expands or contracts to a significantly greater extent than the metal of the pipe. The corrugations also enable the plastic walls and web to yield to accommodate differential expansion and contraction. This feature is important pipe exposed to extremely cold temperature, where an unyielding plastic wall might split as it contracts on the pipe.

From the foregoing description, it is seen that my invention affords a thread protector of simple construction, which not only protects pipe threads against damage, but also effectively excludes water or other foreign material from the inside of the pipe.

I claim:

1. In a protector for pipe threads, which protector includes a plastic body and a metal band encircling said body, the improvement in which said body comprises:
   an outer circumferential wall having corrugations extending along both its outside and inside surfaces;
   a cylindrical inner wall concentric with said outer wall and spaced therefrom;
   means at one end of said outer and inner walls joining said walls;
   the space between said outer and inner walls forming an annular pocket for receiving the end portion of a pipe; and
   means forming internal screw threads in said outer wall, at least certain of said threads being engageable with external threads on the pipe;
   the corrugations in said outer wall enabling the walls to yield as the protector is placed on a pipe, and also enabling the plastic body to expand differentially with respect to the pipe.

2. An improvement as defined in claim 1 in which the means joining said outer and inner walls is a corrugated web integral with both said walls, the corrugations of said web forming continuations of the corrugations of said outer wall.

3. An improvement as defined in claim 2 in which said body comprises in addition integral reinforcing ribs between certain of the corrugations of said web.

4. An improvement as defined in claim 1 in which said body comprises in addition an integral ring joined to the other end of said outer wall for snugly engaging the pipe beyond the external threads, and an integral end wall joined to said inner wall.

5. An improvement as defined in claim 4 in which said ring has a groove in its inner circumference, and comprising in addition an O-ring received in said groove.

6. An improvement as defined in claim 4 comprising in addition a relief valve in said end wall.

7. An improvement as defined in claim 1 in which said band is solid and unbroken, said body comprising in addition stop means on said outer wall over which said band can pass as the band is placed on the body, but retaining the band on the body.

8. An improvement as defined in claim 7 in which said band is tightened against said body by a wedge driven therebetween.

9. An improvement as defined in claim 7 in which said outer wall is tapered, and said band can be driven along the taper to tighten the wall on the pipe.

10. An improvement as defined in claim 1 in which said outer wall carries a plurality of circumferentially spaced lengthwise ribs, said internal threads being formed on said ribs and being of two different types on alternate ribs, one type of threads being engageable with matching external threads on the pipe, said corrugated outer wall being yieldable to enable the internal threads of the other type to overlie the pipe threads without interfering.

11. An improvement as defined in claim 10 in which, said internal threads are V threads and buttress threads and extend straight across said ribs.

* * * * *